Feb. 25, 1930.  O. U. ZERK  1,748,817
LUBRICATING MEANS
Filed Sept. 30, 1929    2 Sheets-Sheet 1
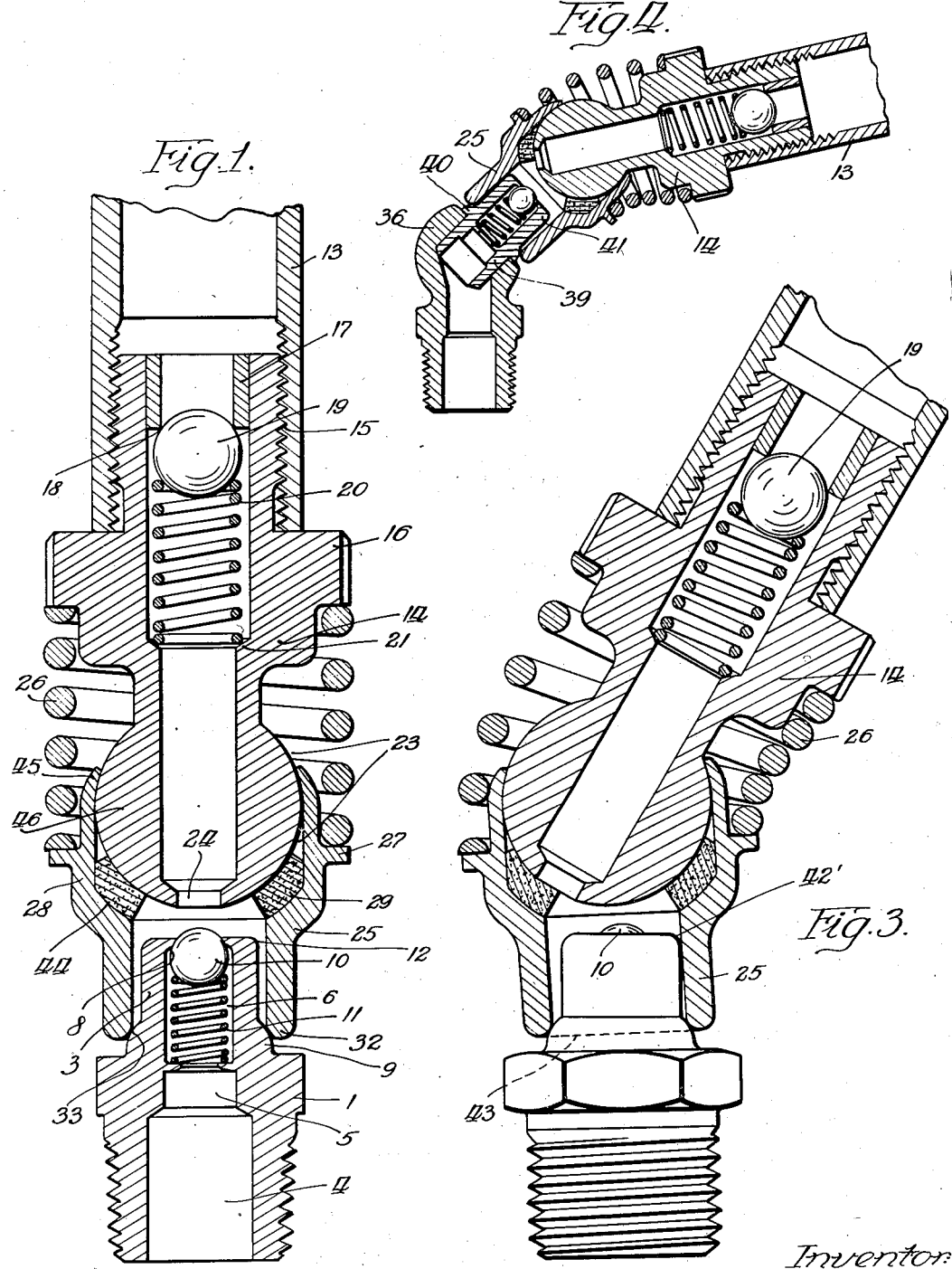

Feb. 25, 1930. O. U. ZERK 1,748,817
LUBRICATING MEANS
Filed Sept. 30, 1929 2 Sheets-Sheet 2

Inventor
Oscar U. Zerk.
By Brown Jackson Boettcher Denner
Attys

Patented Feb. 25, 1930

1,748,817

UNITED STATES PATENT OFFICE

OSCAR U. ZERK, OF CHICAGO, ILLINOIS

LUBRICATING MEANS

Application filed September 30, 1929. Serial No. 396,352.

My invention relates to lubricating means and methods, and is adaptable equally well to vehicular lubrication, such as the chassis bearings of automobiles, tractors, gun carriages, war tanks, locomotives, airplanes, air ships, sea vessels, etc., or to industrial lubrication, that is, to the lubrication of stationary machines, such as stamping presses, printing presses, engines, textile machinery, shafting, and all the other numerous types of machines and machine tools of modern industry.

In grease gun lubrication two types of apparatus are commonly used: First, the interlocking type employing a coupling for the purpose of temporarily interlocking the lubricating gun nozzle and the lubricant receiving nipple, and second, the contact type where the lubricating gun nozzle and nipple are not temporarily interlocked, but simply pressed against each other and held in lubricant communicating contact by manual pressure during the lubricating period.

My invention relates mainly to lubricating means and methods of the said second or contact type, which involve the use of nozzle and nipple couplers which I herein refer to generally as of the contact type, which in the present state of the prior art, I believe to be best exemplified by the apparatus, systems and methods disclosed in Letters Patent of the United States heretofore granted to me as follows:

1,475,980, 1,619,455, 1,632,985, 1,632,986,
1,632,987, 1,645,888, 1,645,889, 1,645,890,
1,655,213, 1,676,626, 1,679,887, 1,679,888,
1,684,080, 1,692,320, 1,696,217, 1,700,527,
1,703,285, 1,703,286, 1,708,040, 1,708,041,
1,710,719, 1,710,959, 1,711,870, 1,711,871,
1,714,254, 1,720,871, 1,720,872, 1,720,873,
1,720,874.

In adapting the apparatus disclosed, for instance, in the first one of the above listed Letters Patent to the requirements of commercial quantity production, it has been found that the results actually secured in practice leave much to be desired. Such apparatus comprising a nipple engaging nozzle having a spherically concave hardened steel surface at its end, engageable with the annular edge of a relatively soft steel nipple end, is found to seriously fail in its intended function of sealing the joint between the nozzle and nipple against the loss of lubricant. In commercial installations on automobiles, for instance, the communication of lubricant from nozzle to nipple has been found to involve loss of lubricant for the following reasons:

First, the annular nozzle engaging edge, surrounding the face at the extreme end of the nipple, if made sufficiently sharp, as it must be, in order to operate most efficiently, is so extremely sensitive to injury by deformation that it is invariably deformed even during the handling of the nipples in the factory where they are produced, by the packaging appliances, by the tools by which they are affixed to the bearings to be lubricated, by being struck in use, by the nozzle of the gun itself, in the effort to make a contact with the nipple, and by being struck in the use of the mechanism to which it is attached by other extraneous objects. When said mechanism is a vehicle, flying stones constantly batter the nipple edges denting them so that the substantially completely annular line contact required by the teachings of the above listed patents is no longer possible.

Second, due to the fact that the angularity of disposition of the lubricant gun nozzle in lubricant tight connection with the nipple relative thereto, as described in the above named patents is limited, the operator does not know, and cannot know, when he has passed the limiting degree of relative angularity in which a substantially leakproof contact may be had. This is especially true when the nipples are covered with a mass of escaped grease with grit particles adhering to it, whereby the tip of the nipple is concealed and the operator cannot observe the direction in which the small tip of the nipple is extended.

He, therefore, very frequently moves the gun beyond the permissible angle and a large sector of the annular edge of the nipple is lifted from engagement with the nozzle contact surface, with the result that the lubricant forced under pressure through the nozzle will pass laterally through the crescent shaped opening thus provided, rather than into the relatively high resistant passages of the nipple and bearing.

Third, it is very difficult in the quantity production of nozzles for guns to commercially obtain the substantially spherical form of nozzle contact face which is required to effect a satisfactory sealing engagement with the annular contact edge of the nipple, even where such edge is carefully formed. Therefore, unavoidable departures from the spherical form cause lubricant to be lost through approximately crescent shaped openings between the nozzle and nipple contact surfaces as in the preceding case.

Fourth, in order to produce nozzles at reasonable cost, the quantity production of the steel nozzles, in practice, is invariably attended by the forming of concentric annular grooves throughout the concave contact nozzle surface. Such grooves are relatively harmless if the nozzle is positioned in substantially axial alignment with the contact edge of the nipple, but provide a multiplicity of avenues of escape for lubricant under high pressure, whenever any appreciable angularity between the nozzle and the nipple is had.

Fifth, many of the nipples are required to be of angular form, these being known as elbow nipples, and are commonly made by projecting a nozzle engaging tubular tip into an angular bore of the nipple base. Due to the fact that the tips are driven into the bodies of the base, and the driving pressure is required to be applied against the nipple tip surface forming the nozzle engaging contact, this driving pressure often results in deformation of such nipple contact surface. Particularly is this true since these tips are provided with an extremely thin wall, commonly not more than one thirty-second of an inch thick, deformation during the assembling operation, takes place if the top surface of the nipple is not exactly parallel with the assembly tool, and also whenever chips come between these two surfaces.

An object, therefore, of my invention is to provide an improved lubricating system involving apparatus which may be manufactured in quantities, inexpensively, and involving the combination of an improved nipple with a cooperating nozzle according to a novel method and in which each of the above difficulties is avoided.

Another object of my invention is to provide an improved manually maintained nozzle and nipple coupler mechanism, of the contact type.

Another object of my invention is to provide an improved method of accomplishing ready manually maintained substantially leakproof contact between a gun nozzle and a nipple, under conditions providing for the disposition of the body of the gun in any of a number of widely varying angular positions, relative to the nipple, without involving objectionable leakage of lubricant for any of the above reasons previously related as pertaining to prior methods, where the attempt was made to accomplish a wide degree of angularity between the gun and associated nipple.

Another object of my invention is to provide an improved lubricating system in which a nozzle of a lubricant gun is adapted to be manually maintained in pressure contact with a lubricant nipple during the lubricating operation under improved conditions permitting the body of the gun to be disposed at widely variable angular positions relative to the nipple but whereby the nozzle itself will not be required to assume widely variant angular positions relative to the nipple.

Another object of my invention is to provide for widely variant angular positioning of the body of the lubricant gun relative to a nipple, at the same time effecting a manually maintained lubricant sealing contact between the gun nozzle and the nipple under improved conditions requiring but slight variance in angularity between the nozzle itself and the nipple.

Another object of my invention is to provide an improved method for effecting a wide degree of relative angularity between the body of the lubricant gun and any one of a plurality of lubricant receiving nipples, with which the gun is entirely manually maintained in contact, while supplying lubricant under high pressure from the gun to the nipple.

Another object of my invention is to provide an improved apparatus for a high pressure lubricating system including a gun nozzle and nipples cooperating therewith, which are adapted to be readily manufactured in quantities, at small expense, in a form which will be effective to provide a good seal against the escape of lubricant when the nozzle is manually maintained in contact with the nipple for the communication of lubricant under pressure from the gun nozzle to the nipple.

Another object of my invention is to provide improved interengaging portions of a lubricant dispensing nozzle and an associated lubricant receiving nipple with cooperant lubricant sealing contact surfaces so formed that the necessity for one of said surfaces being relatively sharp is eliminated.

Another object of my invention is to dispense with the necessity of making one of the said contact surfaces of substantially partispherical form, which is so difficult to attain in practice.

Another object of my invention is to provide means associated with a pair of cooperant contacting surfaces for a nipple and nozzle of a so-called contact lubricating system which permit disposition of the lubricant gun carrying the nozzle, at a considerable angle to the axis of the nipple, during the act of lubrication, under conditions of but slight relative angularity of the nozzle to the nipple, and to form such surfaces in a most efficient manner appropriate to the requirement of merely providing for slight variations in angularity, between the axes of the nozzle and nipple.

Another object of my invention is to provide an improved apparatus for a lubricating system of the above described general character, which will not be susceptible to injury in use.

Another object of my invention is to provide improved lubricating mechanism including a nozzle, and a nipple adapted to receive lubricant under pressure from the nozzle while associated by direct manual thrust of the nozzle toward the nipple, and to provide for guiding the nozzle is guided to its proper lubricant sealing position, which will be effective to restrain the nozzle from engaging the lubricant sealing contact surface of the nipple in such improper way as would otherwise tend to injure it.

Another object of my invention is to provide an improved nipple and nozzle for a lubricating system wherein the nipple is provided with a lubricant sealing contact surface, so disposed as not likely to be struck by flying extraneous objects such as stones or the like.

Another object of my invention is to provide an improved nipple to which a tubular open mouthed nozzle end of a grease gun may be applied to establish a lubricant sealing contact by manual pressure, and in which the contact surface of the nipple is recessed between other nipple surfaces spaced longitudinally of the nipple at either side of the contact surface to shield it against being struck by extraneous objects.

Another object of my invention is to provide a coupler mechanism for a lubricating system involving a lubricant gun nozzle and a lubricant receiving nipple in which the nozzle and nipple are provided with cooperative manually maintained lubricant sealing contacting surfaces adapted to slide, one upon the other, while seating to dislodge particles of grit or the like which would otherwise be interposed between the contacting surfaces and cause leakage of lubricant therebetween.

Another object of my invention is to provide an improved nipple, engageable by a cooperant nozzle of a nozzle guide for a nipple element of a manually maintained coupler involving a lubricant gun whereby the nozzle will be guided to lubricant sealing position upon association of the nozzle with the nipple by a manually directed thrust of the nozzle toward the nipple.

Other objects of my invention and the invention itself will be better understood from the following description of certain embodiments thereof, of my invention wherein reference is to be had to the accompanying drawings illustrating said embodiments.

Referring to the drawings:

Figure 1 is a longitudinal medial sectional view of an embodiment of my invention comprising the nozzle end of a high pressure lubricating gun associated with a nipple mounted on a bearing element, a fragment of which only is shown, the nozzle and nipple being illustrated in substantially axial alignment;

Figure 3 is a view like Figure 2 illustrating the parts of the gun and nozzle, shifted from that position illustrated in Figure 2, by the application of longitudinal pressure, manually applied to the gun, directed toward the nipple;

Figure 4 is a longitudinal medial sectional view of a nozzle applied to a nipple carried in a mount to form an elbow nipple element, which is another embodiment of my invention;

Figure 2:
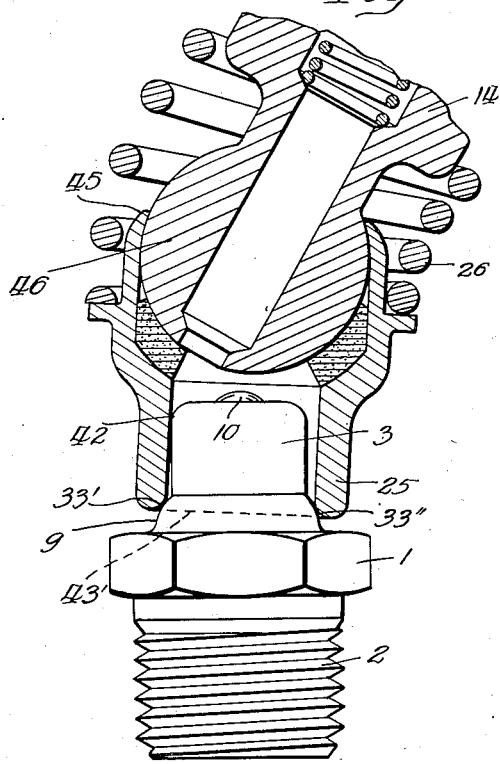
Figure 2 is a similar view of a gun nozzle end applied to a nipple, both as in Figure 1, the nipple being shown, however, in elevation and the nozzle being disposed at a slight angle to the axis of the nipple with the gun end shown as preliminarily disposed at a greater angle thereto.
Figure 5:
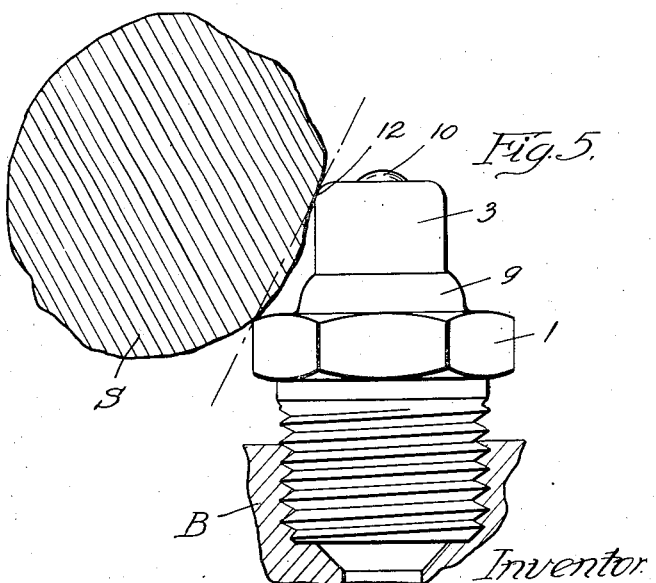
Figure 5 is an elevational view of a nipple assumed to be attached to an element of a bearing for an automobile chassis and in which a small stone is shown as thrown against the nipple.

Referring now to Figures 1 to 3, inclusive, and Figure 5, in all of which like parts are designated by like reference characters, at 1 I show a base of a nipple having a preferably hexagonal lateral surface. An externally threaded taper stem 2 extends longitudinally of the base in one direction and a reduced tubular shaft 3 extends longitudinally from the base in the opposite direction, the base, stem and shaft being, preferably, integrally formed from a single piece of steel and provided with a longitudinal bore extending therethrough. The hexagonal base adapts the nipple for turning by a wrench to apply the nipple, by its stem to an element of bearing to be lubricated.

The bore comprises the several successively reduced interconnecting portions 4, 5 and 6, there being provided between the bore portions 5 and 6 an interiorly extending flange 7 of annular form, provided by broaching the material thereof from the annular walls of the bore portion 5.

An inwardly extending annular flange 8 is provided at the shaft end of the nipple bore and restricts the area of opening through the shaft. Intermediate the base 1 and the shaft 3 I provide a shoulder contact portion 9 which is provided with an annular outer contact surface, of progressively decreased diameter proceeding longitudinally of the nipple, said contact surface being presented towards the nozzle receiving free end of the shaft.

The shoulder contact portion 9, within the purview of this invention, may have its outer contact surface of any of many different forms, taken in the longitudinal direction; in the embodiment illustrated, such outer contact surface is longitudinally curved, the radius of its longitudinal curvature being approximately equal to one-fourth of the diameter of the shoulder portion when measured transversely of the nipple, at its portion of greatest transverse diameter. A check valve ball 10 is continuously pressed to seating engagement with the inner edge of the flange 8 by a helical spring 11, whose one end engages the ball, and whose other end terminates in an annulus seated upon the flange 7. The tubular shaft 3 is provided with a preferably cylindrical outer surface and preferably has an upper rounded edge 12.

Any suitable form of lubricant compressor gun such, for instance, as are disclosed in the different above listed patents, may be employed to supply lubricant to the nipple, as described, when such a gun is provided with a suitable open ended nozzle such as the one shown; the tubular end of the gun 13 supports a nose 14 screw threaded at 15 therein, the nose having a shoulder flange 16 near its threaded end and is longitudinally bored throughout its length; an annular ball valve seat element 17 is forced into its one end to form a ball seat 18 at its inner edge for a check valve ball 19 pressed to seat thereagainst by a helical spring 20.

The spring 20 engages, by its one end, the ball 19 and by its other end, with a shoulder, 21, of the bore, formed intermediate of its ends. The nose 14 terminates in an end 22 having a parti-spherical surface 23 which is centrally bored at 24 to form a lubricant discharge opening for the nose. The nose 14 carries a tubular nozzle 25 fitted onto the ball end of the nose in such a manner as to make close fitting leakproof pressure engagement with the parti-spherical end surface 23 thereof.

The tubular nozzle 25 is provided with an outwardly extending annular flange 27 extending from an enlarged socket portion of the nozzle having tubular lateral walls 28. An annular gasket 29 of a compressible material such as cork or the like is seated on the shoulder 44 provided by the junction of the walls 28 with the reduced portion of the nozzle.

The ball end 46 of the nose 14 being then projected into the socket provided by the nozzle walls 28 the walls 28 are pressed inwardly, as shown at 45, against the lateral surface of the ball-shaped end 46 of the nose. The contact between the inturned end portions 45 of the nozzle walls with the outer surface 23 of the ball 46 is had along an annular surface of the ball disposed on the other side of its medial circumferential portion relative to the gasket 29 and, therefore, effects a longitudinal pressure effort of the ball 46 against the gasket 29 holding it in compression and effecting, therefore, a good lubricant seal of the ball and nozzle surfaces engaged by the gasket.

Interposed between the flange 27 of the nozzle and the flange 16 of the nose, is a helical spring 26 held to longitudinally compressed form with its convolutions placed, while in such form, sufficiently close together that when the nozzle 25 is oscillated over the parti-spherical surface 23 of the gun nose, as illustrated, for instance, in Figures 2 and 3, the successive convolutions of the spring 26 at one side of the spring will be brought towards engagement, and when the nozzle is moved to a still more angular position relative to the nose they may be brought into contact and will more strongly resist further angular movement of the nozzle relative to the nose.

The spring 26 is threaded to its position as shown over the flange 27 which is of relatively small thickness, to adapt it for the purpose of permitting the spring to be threaded thereover.

In this manner I provide a form of universal joint between the nose and the nozzle resisting but resiliently yielding to pressure effecting variation of axial alignment between the nose and nozzle, in which objectionable loss of lubricant between the contacting surfaces of nose and nozzle is avoided and in which the principal parts will be resiliently restored to alignment after the manually effected pressure, disturbing such alignment, is removed.

Engageable with the outer longitudinally rounded inclined contact surface of the annularly formed portion 9 of the nipples, employed in my improved lubricating system, as previously described, I provide a suitable contact end portion for the nozzle 25 of the lubricant gun; at 32 the contact end portion for the nozzle is shown as being annular in form and transversely rounded on its end surfaces. Although the form of contact surface of the nozzle end 22 which engages the contact surface of the nipple portion 9 may be varied, within the purview of this invention, in the embodiment illustrated, the nozzle contact surface 33 is transversely rounded on a radius which is about two-fifths that of the radius of longitudinal curvature of the nipple contact surface.

However, in the broader aspects of my invention the precise longitudinal configuration of the nozzle and nipple contacting surfaces are susceptible to wide variation; moreover, nipple contact surfaces variable in longitudinal configuration are each susceptible to efficient use in my improved system in combination with nozzle contact surfaces of widely varying forms.

Referring now more particularly to Figure 4 of the drawings, illustrating what is commonly known as an elbow nipple, in the embodiment illustrated, this is made in two tubular parts, the stem of the part constituting the nipple per se, being tightly pressed into an angularly extending portion of the bore of a head of the other part which constitutes a support, for the said nipple per se.

The support 34 is provided with a tapered threaded stem 35, corresponding to the stem 2 of Figure 1 in its relation to the bearing part associated with such stem, a head 36, and an intermediate waist 37 having a preferably hexagonal outer surface. The stem is bored longitudinally at 38, the bore extending into the head through the waist to communicate with a bore of the head disposed angularly to the bore 38; in the latter angular bore, the stem 39 of the nipple, per se, is tightly pressed.

The nipple element per se of Figure 4 with such an intermediate hexagonal base 1 as provided for the nipple of the other figures, and its stem is preferably provided with a substantially cylindrical outer surface, adapted for projection into the head 36, until the base of the shoulder portion 40 engages with the head. The portion 40, functionally corresponds to the shoulder portion 9 of the straight type nipple of the foregoing figures.

The operation of communicating lubricant from a lubricant gun under high pressure is effected, generally, in the manner typical of contact lubricating systems, wherein the gun nozzle is manually pressed into engagement with the nipple and the forwardly directed pressure effort exerted upon the gun by its handle, neither of which is shown, though well understood in this art, preferably contributes to the degree of fluid pressure exerted upon and by the lubricant in the gun, and at the same time sets up sealing pressure between the cooperant contacting surfaces of the nozzle and nipple.

In the embodiment illustrated in Figures 1 to 3, inclusive, and 5, Figure 1 illustrates the nozzle end only of the gun, in association with a nipple, for communicating lubricant from the gun to the nipple, the gun, nozzle, and nipple being illustrated as being in approximately axial alignment. When the lubricant in the gun is put under sufficient pressure, usually by manual effort, the valve balls 19 and 10 are successively unseated by the pressure of lubricant forced through the communicating bores of the lubricant nose 14, the nozzle 25, and entering the bore of the nipple shaft 3.

The lubricant seal effected between the parti-spherical surface 23 of the gun nose and the gasket 29, interposed between the nose 14 and nozzle 25, is intensified by the manual pressure exerted longitudinally of the gun barrel 13 toward the nipple.

At the same time this manual pressure is effective to maintain a good lubricant sealing contact between the contact surfaces of the nozzle end 32 and the nipple portion 9. Communication of lubricant from the gun nozzle to the interior bore of the nipple will be, therefore, manually maintained, without objectionable loss of lubricant.

Figure 2 shows the nose 14 of the lubricant gun deflected angularly relative to the axis of the nipple shaft 3 preparatory to injection of lubricant from the gun into the nipple from such a relative angular position. The intermediately disposed nozzle 25 under such a condition, responds by taking the preliminary position shown in Figure 2, wherein the portion of its annular contact surface 33' disposed most remote from the gun slides upwardly upon the inclined contact surface of the nipple portion 9 and the nearer contact surface portion 33" slides downwardly upon the annular contact surface of the nipple portion 9, until further movement of the nozzle on the nipple contact surface is arrested by engagement of the inner surface of the nozzle bore with the outer surface of the nipple shaft 3 near its end at 42.

The engagement at 42 of the nozzle and nipple arrests further angular displacement of the nozzle relative to the nipple although at the same time the gun axis of the nose 14 is inclined considerably relative to the axis of the nozzle 25.

The subsequently occurring lubricating operation preferably effected in the usual manner by incidental manually directing a thrust effort of the gun toward the nipple, then causes a reverse sliding and oscillative movement of the nozzle on the surface of the nipple portion 9, to the position indicated in Figure 3, until further tilting of the nozzle 25 in an angular direction relative to the axis of the nipple shaft 3 opposite to the angular direction of the gun nose 14 is arrested by inter-engagement of lateral surfaces of the nipple shaft and the interior surface of the nozzle bore at 42', closely adjacent the end of the shaft. The continuance of manual pressure effects, in the wellknown way, communication of lubricant past the valve balls 19 and 10, a good lubricant seal being had, meanwhile, between the engaged contact surfaces of the nozzle and nipple along the substantially annular zone of contact indicated by a dotted line in Figure 3 at 43.

As shown in Figure 3 the zone 43, of sealing contact during the lubricating operation, is inclined upwardly from left to right, and referring back now to Figure 2, the preliminary zone of contact indicated by the dotted line 43' is reversely inclined downwardly from left to right. This shifting of the zone of contact is had during each lubricating operation, since practically, precise angular alignment of the nose of the gun with the nipple shaft rarely occurs, and the sliding of the engaged contact surfaces is, therefore, substantially always effective to wipe the interengaging contact surfaces of the nozzle and nipple, to clear them of such dirt particles as may have collected thereon.

This wiping action is likewise effective upon the contact surface of the nozzle in contact with the nipple contact surface, since because, and by virtue of the fact that the contact surfaces of the nozzle and nipple are formed otherwise than as a parti-surface of a sphere, in the different angular positions of the nozzle, a sliding action of the nipple contact surface across that of the nozzle must necessarily and inevitably take place.

Referring now to Figures 1 to 3, inclusive, and Figure 5, three different angular positions of the nozzle relative to the nipple are therein shown; in Figure 1 only, illustrating a condition of axial alignment of nozzle and nipple, the outer walls of the nipple shaft 3 are shown as being spaced from the inner walls of the nozzle bore substantially equally all around the shaft. This precise condition, during a lubricating operation, seldom prevails, but is never widely departed from due to the engagement as described, as at 42 and 42', of the nozzle and nipple interiorly of the nozzle.

In an embodiment of my invention wherein the parts are relatively proportioned as illustrated in enlarged views, the bore of the nozzle may be one-thirty-second of an inch greater in diameter than the surface of the nipple shaft to provide one-sixty-fourth of an inch spacing when the parts are in the position shown in Figure 1; I then preferably make the shaft 3 of such a length, which in the embodiment illustrated is approximately three-sixteenths of an inch, that nozzle arresting engagement between the shaft and the interior surface of the nozzle will occur when the nozzle is angularly deflected about three degrees from axial alignment relative to the shaft. The engagement at 42 and 42' arrests movement of the nozzle to further departures from alignment of the nozzle 25 relative to the lubricant receiving nipple shaft.

Upon an effort by the operator to position the gun with its axis disposed more angularly, relative to the nipple shaft, than a three degree departure from alignment this is accomplished, within practical limits, by the oscillation of the parti-spherically formed nose end surface 23 on the annular surface 29 of the nozzle, against the resiliency of the connector spring 26 tending to maintain the nose and nozzle in alignment.

I find that within prescribed limits of three degrees variation in all possible angularly different relative positions of nozzle and nipple, for the embodiment as illustrated and described, the width of any possible crevice which may occur between properly formed contact surfaces of the nozzle and nipple, formed as described, cannot, in any case, exceed approximately .00005 of an inch; for lubricant of any viscosity employed in lubricant guns of the type contemplated herein, during the period of any lubricant dispensing operation, this will not permit sensible loss of lubricant through such a crevice; irregularities in commercial production of nipple surfaces produce variations in surface form which are in excess of the above given dimension for the crevice, resulting alone from the form of the contacting surfaces and the varying angular positions of the nozzle relative to the nose. Such crevices resulting from such variations, for a three degree variation of angularity are, therefore, too minute for serious consideration, and do not practically effect loss of lubricant.

However, a better sealing contact may be had between the more abruptly curved interengaging contact surfaces of the nozzle and nipple contemplated herein than would be possible were the surfaces, or either of them, less abruptly longitudinally curved, as has been proposed heretofore in some of my said prior patents.

By providing a relatively short stubby shaft for the nipple and by suitably rounding the end contact surfaces of the nozzle, and by virtue of the reaction of the spring 26 distorted after the manner illustrated in Figures 2 and 3, should the operator attempt to achieve greater angularity of the gun relative to the nipple than is practical, in order to achieve sufficient sealing pressure derived from the manual thrusting effort of the operator upon the gun, the nozzle 25 will be snapped over and off of the nipple shaft and the operator will not waste effort and lubricant, in a misdirected continued effort to achieve lubrication, with the gun held too angularly, relative to the nipple.

Figure 6:
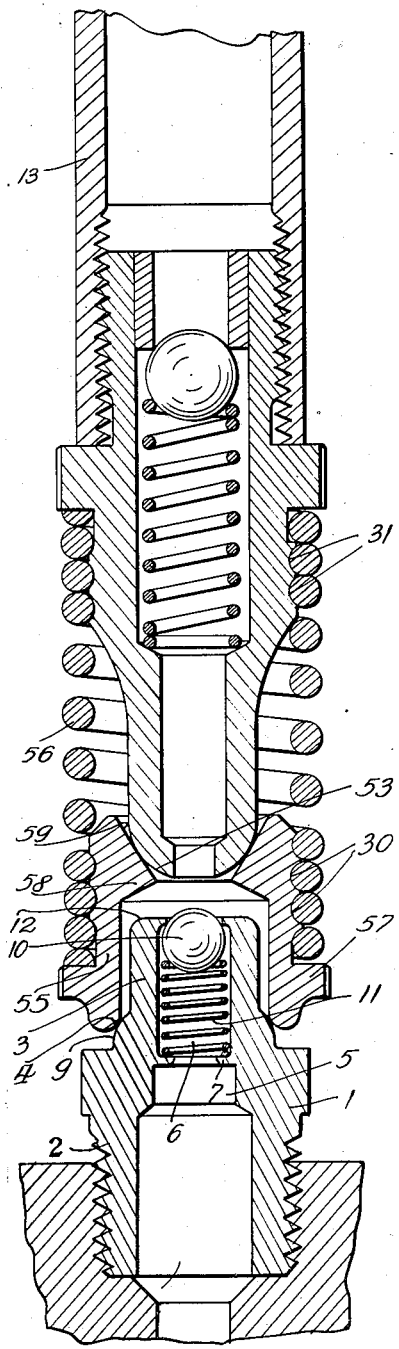
Figure 6 is a view corresponding to that of Figure 1 but illustrating another embodiment of my invention.

In the embodiment of my invention shown in Figure 6, the tubular nozzle 55 is provided with an outwardly extending annular flange 57 near its one end and an inwardly extending annular flange 58 near its other end. The flange 58 is provided with inwardly extending converging walls frusto-conical in form, the frustro-conical wall 59 thereof making leakproof pressure engagement with the said parti-spherical surface 53 of the lubricant gun nose which is projected within said walls 59.

Intermediate the flanges 57 and 58 the bore of the nozzle is made sufficiently large in diameter as to permit the nozzle to be fitted quite easily over the shaft 3 of a nipple such as that above described, and of which a large number will be provided on a mechanism adjacent bearings thereof for receiving lubricant, interchangeably, from the same gun in accordance with the prevailing practice.

Both the nose of the gun and the nozzle have corresponding outer surfaces correspondingly helically grooved, as shown at 30 for the nozzle and at 31 for the nipple, to receive therein successive of the opposite end coils of the helical spring 56 which are screw threaded onto said helically grooved surfaces of the nose and nozzle.

By predetermining the length of the spring relative to the spacing and length of the parts joined, when the parts are screw threaded to the spring, it is caused to be longitudinally extended against its resiliency, in such a manner as to effect separation of successive of its intermediate convolutions; the reaction of the spring resisting such separation of its convolutions draws the gun nose and the nozzle therefor together in such a way as to preliminarily establish a very firm spring pressure maintained contact between the parti-spherical end surface of the nose and the frustro-conical nose engaging surface of the nozzle.

Figure 5 is an elevational view of a nipple assumed to be attached to an element of a bearing B disposed, say, on the under side of an automobile chassis near the wheels and with a fragment of stone shown at S thrown by the wheels against the nipple. This figure is illustrative of the importance of recessing the contact face of the nipple portion 9 relative to the other parts of the nipple which in the embodiment of my invention illustrated are the peripheral portions of the base 1 and the end peripheral portion of the shaft 3, which are alone engaged by the stone S to prevent further inward movement of the stone towards the surface of the portion 9 to injure it. When one considers that the distance along the line X—X joining the protecting portions of the nipple is but nine thirty-seconds of an inch in nipples of commercial size, the fact that these projecting portions will protect the relatively recessed contact surface of the nipple portion 9 against even very small stones, is quite evident.

In the practical use of the gun nozzle and nipples of my invention lubricant remaining in the recessed nozzle, after a lubricating operation, and resulting therefrom, effects a cleaning of a nipple upon which the lubricant containing nozzle is next telescoped. In such a case the nipple shaft 3, displaces lubricant therefrom which flows, with force along the lateral walls of the shaft, a very small film of the lubricant passing with substantial velocity from the space between the shaft and the interior walls of the nozzle, between the contact surfaces of the nozzle and nipple, disposed at the base of the shaft 3, as these contact surfaces closely approach each other.

This moving film of lubricant, though in negligible quantity, is squeezed between the seating contact surfaces of nozzle and nipple clearing such surfaces of any accumulated layer of dirt and grit particles. The contact surfaces of the nozzle and the nipple being then brought together with considerable pressure bites the thin film of expressed lubricant, laden with the particles of dirt and grit, from the annular body of lubricant then surrounding the shaft of the nipple.

Upon withdrawing the gun nozzle from the nipple much of the annular body of lubricant, above referred to as surrounding the nipple shaft, is drawn upwardly with the nozzle by virtue of a partial vacuum at the time created within the nozzle mouth by the removal therefrom of the end of the nipple. Some of this lubricant will be retained on the end surface of the nipple, supplemented to some extent by such lubricant as may at the same time pass the valve ball 10 of the nipple. Ball valves for lubricant nipples of commercial types are not made with sufficient care to efficiently perform the function of a check valve but are relied upon chiefly as a closure of the nipple mouth against the ingress of dirt. The lubricant in the nipple, under pressure, having compressed air bubbles in the lubricant will react, usually, to express a small amount of lubricant for the end of the nipple shaft.

The mouth of the nozzle is thereby left with a considerable supply of lubricant which adheres largely to its lateral interior surfaces, and which forms a lining for the lateral walls of the lubricant nozzle mouth.

Now when the lubricant lined lateral walls of the nozzle mouth are next telescoped over another nipple, the lubricant lining engaging with the periphery of the nipple shaft will trap air in the mouth which becoming compressed as the nozzle is advanced onto the nipple sets up a pressure forcing lubricant longitudinally along the lateral walls of the nipple stem to squeeze the thin film of lubricant, previously mentioned, between the closely approaching lubricant sealing contact surfaces of the nozzle and nipple.

Should the nozzle mouth be so completely filled with lubricant prior to placing it over a nipple shaft that no air would be trapped, the pressure is set up by simple displacement of lubricant by the nipple shaft and the same contact surface cleaning film of liquid expressed between the meeting contact surfaces of the nozzle and nipple, at substantial velocity, as before.

I do not claim herein the nipple per se as disclosed in the different figures of drawing hereof, these being claimed, per se in my copending application Serial No. 397,714 filed October 5, 1929.

Having thus described my invention in certain embodiments and under certain conditions of use I am aware that numerous and extensive departures may be made from the embodiments herein illustrated and described, and adaptations made for other conditions of use, without departing from the spirit of my invention.

I claim:

1. In a lubricating system, the combination of a nozzle and a nipple of the contact type, said nipple comprising joined tubular stem and shaft portions, said nipple having an annular contact surface presented toward the free end of the shaft but substantially spaced therefrom, said nozzle terminating at its discharge end in a tubular portion of substantially larger diameter than the shaft and engageable with said contact surface to effect a lubricant seal therewith when telescoped over the shaft.

2. In a lubricating system, the combination of a nozzle and a nipple, of the contact type, said nipple comprising joined tubular stem and shaft portions, said nipple having an inwardly inclined annular contact surface presented toward the free end of the shaft but substantially spaced therefrom, said nozzle terminating at its discharge end in a tubular portion of substantially larger diameter than the shaft, telescopable thereover and engageable with said contact surface to seal the joint thereat between the nozzle and the nipple against escape of lubricant throughout a plurality of different angular relative positions of nozzle and nipple.

3. In a lubricating system, a nozzle terminating in a tubular end, a nipple of the contact type comprising joined tubular stem and shaft portions, and having an inwardly inclined annular surface presented toward but substantially spaced from the free end of the shaft, said nozzle end freely telescopable over the shaft to make a manually maintained wedging lubricant sealing pressure engagement with said annular surface.

4. In a lubricating system, a nozzle terminating in a tubular end, a nipple of the contact type comprising joined tubular stem and shaft portions, and having an inwardly inclined annular surface presented toward but substantially spaced from the free end of the shaft, said nozzle end freely telescopable over the shaft to make a manually maintained wedging lubricant sealing pressure engagement with said annular surface, said nozzle having an interiorly disposed wall surface engageable with the shaft near its free end to limit the relative angular positions of said nozzle and shaft.

5. In a lubricating system, a lubricant gun terminating in a lubricant dispensing nozzle, said nozzle swivelably carried on a nose of the gun, and terminating in a tubular end, a nipple of the contact type comprising joined tubular stem and shaft portions, and having an inwardly inclined annular surface presented toward but substantially spaced from the free end of the shaft, said nozzle freely telescopable over the shaft to make a manually maintained wedging pressure lubricant sealing engagement with said annular surface, said nozzle having an interiorly disposed wall surface engageable with the shaft near its free end to limit the angular movement of said nozzle relatively to the shaft, while said pressure engagement is maintained.

6. In a lubricating system, a nozzle terminating in a substantially cylindrical tubular end, a nipple of the contact type comprising joined substantially cylindrical stem and shaft portions, said nozzle end freely telescopable over the shaft, the interior nozzle bore walls upon lateral movements of the nozzle relative to the shaft engageable therewith to restrict said movements, and a substantially lubricant leakproof oscillative coupler contact means for said nozzle and nipple comprising the tip of said nozzle end and an annular bead of said nipple engageable thereby, disposed substantially remote from its end, operable responsive to manually effected pressure directed upon the nozzle longitudinally thereof toward the nipple.

7. In a lubricating system, a lubricant gun having a terminal nose, and a nozzle oscillatively carried thereon, a nipple of the contact type comprising a tubular shaft and a shoulder portion providing an inwardly inclined annular surface presented toward but substantially spaced from a free end of the shaft, said nozzle freely telescopable over the shaft to make a manually maintained wedging lubricant sealing pressure engagement with said annular surface.

8. In a lubricating system, a lubricant gun having a terminal nose, and a nozzle, oscillatively carried thereby, a nipple of the contact type comprising a tubular shaft and a shoulder portion providing an inwardly inclined annular surface presented toward but substantially spaced from a free end of the shaft, said nozzle freely telescopable over the shaft to make a manually maintained wedging lubricant sealing pressure engagement with said annular surface, and means comprising a spring carried by the gun for resiliently constraining the nozzle toward a normal position of its axis relative to that of the gun nose.

9. In a lubricating system, a lubricant gun having a terminal nose, and a nozzle oscillatively carried thereon, a nipple of the contact type comprising a tubular shaft and a shoulder portion providing an inwardly inclined annular surface presented toward but substantially spaced from a free end of the shaft, said nozzle freely telescopable over the shaft to make a manually maintained wedging lubricant sealing pressure engagement with said annular surface, and a coiled spring joining said nose and nozzle and exerting pressure therebetween in the longitudinal direction.

10. In a lubricating system, a lubricant gun having a terminal nose, and a nozzle, a nipple of the contact type comprising a tubular shaft and a shoulder portion providing an inwardly inclined annular surface presented toward but substantially spaced from a free end of the shaft, said nozzle freely telescopable over the shaft to make a manually maintained wedging lubricant sealing pressure engagement with said annular surface, said nozzle and nose making oscillative lubricant sealing contacting engagement by a relatively narrow annular zone of contact defining the peripheral limit of a lubricant space around the shaft between the nose and nozzle, effecting intercommunication of lubricant from the nose to the nozzle in any of a number of angularly different relative positions of the nose and nozzle, and a coiled spring joining said nose and nozzle and exerting pressure therebetween to maintain lubricant sealing contact between the nozzle and nose.

11. In combination with a nipple of a contact type lubricating system, a nozzle therefor, and means operative, after placement of the contact surface of the nozzle into engagement with the contact surface of the nipple, responsive to manual pressure exerted on the nozzle in the direction of the nipple to laterally slide the nozzle contact surface over the nipple contact surface.

12. In combination with a nipple of a contact type lubricating system, a nozzle therefor, and means operative responsive to manual pressure exerted on the nozzle in the direction of the nipple to laterally reciprocate the nozzle contact surface over the contact surface of the nipple.

13. In combination with a nipple of a contact type lubricating system, a nozzle therefor, and means operative responsive to manual pressure exerted on the nozzle in the direction of the nipple to reciprocate the nozzle contact surface over the contact surface of the nipple, said means including a spring and universal joint means for the nozzle, said spring resiliently resisting movement of the universal joint means.

In witness whereof, I hereunto subscribe my name this 28th day of September, 1929.

OSCAR U. ZERK.